(12) United States Patent
Gondi et al.

(10) Patent No.: US 10,120,770 B2
(45) Date of Patent: **\*Nov. 6, 2018**

(54) GROUPING FAILURE EVENTS WITH ADAPTIVE POLLING AND SLIDING WINDOW BUFFERING

(71) Applicant: VMware, Inc., Palo Alto, CA (US)

(72) Inventors: Anjaneya Prasad Gondi, Fremont, CA (US); Hemanth Kalluri, San Jose, CA (US); Naveen Kumar Kalaskar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 15/347,536

(22) Filed: Nov. 9, 2016

(65) Prior Publication Data
US 2017/0060660 A1    Mar. 2, 2017

Related U.S. Application Data

(63) Continuation of application No. 13/856,167, filed on Apr. 3, 2013, now Pat. No. 9,507,685.

(51) Int. Cl.
 *G06F 11/30* (2006.01)
 *G06F 11/07* (2006.01)
 *G06F 11/20* (2006.01)

(52) U.S. Cl.
 CPC ........ *G06F 11/301* (2013.01); *G06F 11/0712* (2013.01); *G06F 11/0778* (2013.01); *G06F 11/0793* (2013.01); *G06F 11/20* (2013.01); *G06F 11/2023* (2013.01); *G06F 11/2033* (2013.01); *G06F 11/3006* (2013.01); *G06F 11/3055* (2013.01); *G06F 11/3072* (2013.01); *G06F 11/3075* (2013.01); *G06F 11/3082* (2013.01); *G06F 11/0709* (2013.01); *G06F 11/0751* (2013.01); *G06F 11/3096* (2013.01)

(58) Field of Classification Search
 CPC ............. G06F 11/0709; G06F 11/0712; G06F 11/0751; G06F 11/0778; G06F 11/0793; G06F 11/20; G06F 11/3096; G06F 11/3072; G06F 11/3075; G06F 11/3082; G06F 11/2023; G06F 11/2033; G06F 11/3006; G06F 11/301; G06F 11/3055; G06F 11/3452
 See application file for complete search history.

(56) References Cited

U.S. PATENT DOCUMENTS

| 6,453,430 | B1 * | 9/2002 | Singh | G06F 11/0715 712/227 |
| 7,570,580 | B1 * | 8/2009 | Bajpay | H04L 41/064 370/216 |
| 8,959,402 | B2 * | 2/2015 | Giddi | G06F 11/0742 714/47.2 |

(Continued)

*Primary Examiner* — Paul Contino

(57) ABSTRACT

Embodiments detect and group multiple failure events to enable batch processing of those failure events, such as in a virtual datacenter executing a plurality of virtual machines (VMs). A long timer, adaptive short timer, and adaptive polling frequency enable a computing device to efficiently detect and group the failure events that may be related (e.g., resulting from one failure). The grouped failure events are processed in parallel thereby reducing the time for recovery from the failure events.

20 Claims, 8 Drawing Sheets

(56) References Cited

U.S. PATENT DOCUMENTS

| | | |
|---|---|---|
| 2002/0023242 A1 | 2/2002 | Kidokoro |
| 2003/0101371 A1* | 5/2003 | Fairhurst ............. G06F 11/0727 |
| | | 714/5.11 |
| 2005/0081114 A1* | 4/2005 | Ackaret ................ G06F 11/076 |
| | | 714/42 |
| 2007/0078976 A1 | 4/2007 | Taylor |
| 2013/0198574 A1 | 8/2013 | Higley |
| 2014/0047263 A1 | 2/2014 | Coatney |
| 2014/0201564 A1 | 7/2014 | Jagtiani |
| 2015/0319635 A1* | 11/2015 | Bergquist ............. H04L 1/1685 |
| | | 370/241.1 |

* cited by examiner

GROUPING FAILURE EVENTS WITH ADAPTIVE POLLING AND SLIDING WINDOW BUFFERING

CROSS-REFERENCE TO RELATED APPLICATION(S)

This application is a continuation of U.S. Pat. No. 9,507,685, issued Nov. 29, 2016, entitled "Grouping Failure Events with Adaptive Polling and Sliding Window Buffering", which is incorporated by reference herein.

BACKGROUND

Virtualization provides datacenters with highly efficient and available resource, networking, and storage management to reduce infrastructure costs such as capital, power, space, cooling, labor, and the like. In particular, virtual datacenters can have numerous host machines each executing thousands of virtual machines (VMs) or other guest operating systems. In such virtual datacenters or other shared storage systems, multiple hosts may share the same set of storage devices. Each storage device may have one or more arrays of disks. When one of the disks in one of the arrays experiences a failure (e.g., a hardware failure), numerous hosts and VMs may be affected. In such instances, some of the existing systems failover the entire array (including VMs and datastores) to a backup or redundant array.

Further, hardware failures often cascade such that a single disk failure in a single array may spawn multiple additional failure events related to the original disk failure. As such, the existing recovery systems have to process numerous failure events around the same time. However, the existing systems lack a mechanism for recognizing that some of the failure events may be related to an original failure event. As such, to preserve data consistency and reduce disruption to end users, the existing systems process the numerous failure events serially or otherwise end-to-end, such that recovery for one of the affected arrays begins only after completion of recovery for another one of the affected arrays. As such, with the existing systems, the recovery time resulting from hardware failures can be excessive.

SUMMARY

One or more embodiments described herein detect and group failure events in a virtual datacenter having a plurality of virtual machines (VMs) executing therein. To facilitate batch processing of the failure events, embodiments described herein use adaptive polling intervals and sliding window buffering.

In some embodiments, a computing device accesses an adaptive frequency, a value for a short timer, and a value for a long timer. The computing device polls for failure events in the virtual datacenter according to the accessed adaptive frequency until the short timer or the long timer expires. Upon detection of one or more of the failure events during the polling, the computing device buffers the detected failure events, increases the adaptive frequency, and resets the short timer. Upon expiration of the short timer or the long timer, the computing device processes the buffered failure events in parallel, resets the short timer, and resets the long timer. For example, the computing device processes the buffered failure events by performing recovery and/or replication operations in parallel for each of the buffered failure events.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 2:
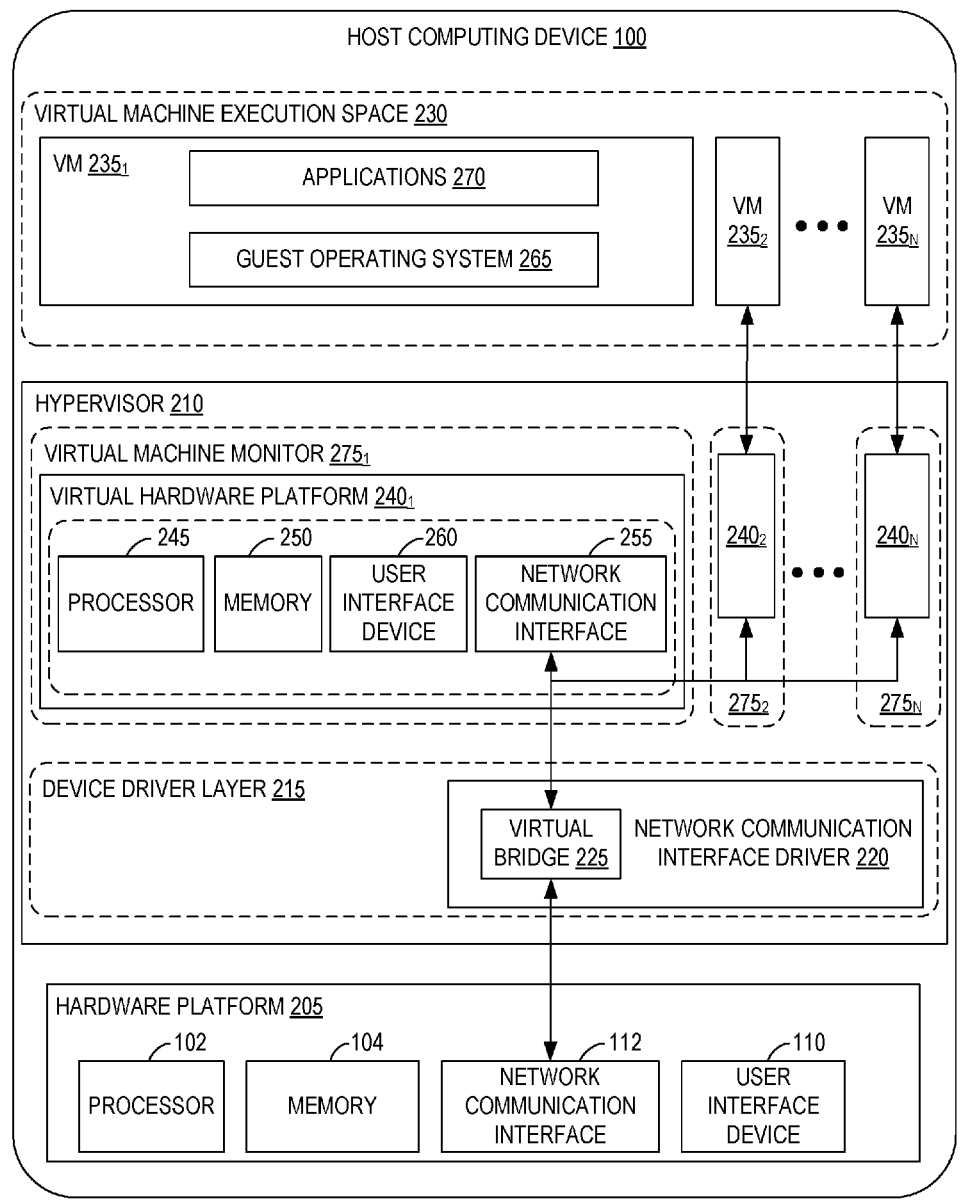
FIG. 2 is a block diagram of virtual machines that are instantiated on a computing device, such as the host computing device shown in FIG. 1.

Referring to the figures, embodiments described herein increase the responsiveness to failure events in a virtual datacenter having a plurality of virtual machines (VMs) executing therein, such as VMs 235 shown in FIG. 2. The failure events are detected and buffered using adaptive polling and sliding windows and then batch processed, in parallel in some embodiments. Accordingly, the efficiency of failure processing and thereby the entire recovery process is enhanced. For example, many of the failure events in the batch may be related to the same recovery plan (e.g., the same disks within an array, or disks otherwise associated or linked with one another).

In some embodiments, adaptive polling is combined with sliding window buffering to efficiently detect, group, and process the failure events. Further, by adjusting the polling intervals, aspects of the disclosure are able to collect data associated with failure events at the time of the failure events (e.g., contemporaneously). By processing the multiple failure events together as described herein, embodiments of the disclosure decrease the overall recovery time of failure events that are likely related or correlated (e.g., a single large disk failure that involves multiple single device failures).

An exemplary operating environment including a host computing device 100 executing one or more VMs 235 is next described. Aspects of the disclosure, however, are not limited to such an environment, and instead are applicable in non-VM environments.

Figure 1:
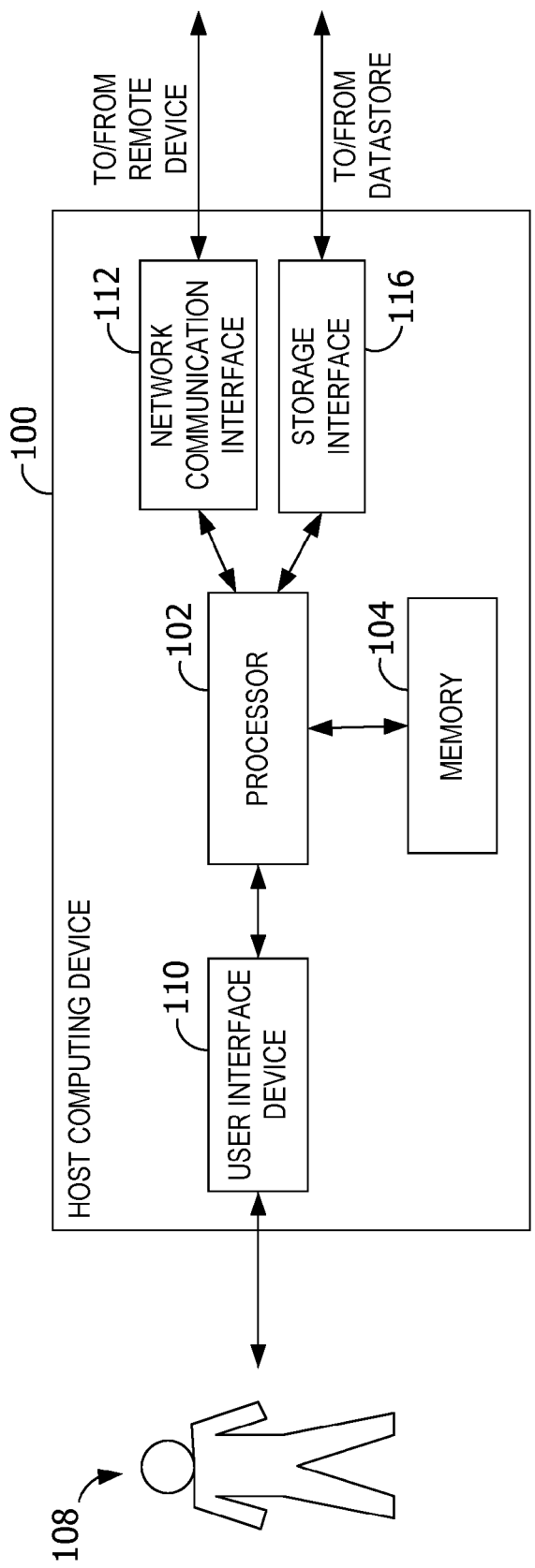
FIG. 1 is a block diagram of an exemplary host computing device.

FIG. 1 is a block diagram of an exemplary host computing device 100. Host computing device 100 includes a processor 102 for executing instructions. In some embodiments, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid state disks, and/or optical disks.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some embodiments, user interface device 110 operates to receive data from user 108, while another device (e.g., a presentation device) operates to present data to user 108. In other embodiments, user interface device 110 has a single component, such as a touch screen, that functions to both output data to user 108 and receive data from user 108. In such embodiments, user interface device 110 operates as a presentation device for presenting information to user 108. In such embodiments, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some embodiments, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In exemplary embodiments, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

FIG. 2 depicts a block diagram of virtual machines $235_1$, $235_2$ ... $235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some embodiments, memory 250 in first virtual hardware platform $240_1$ includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
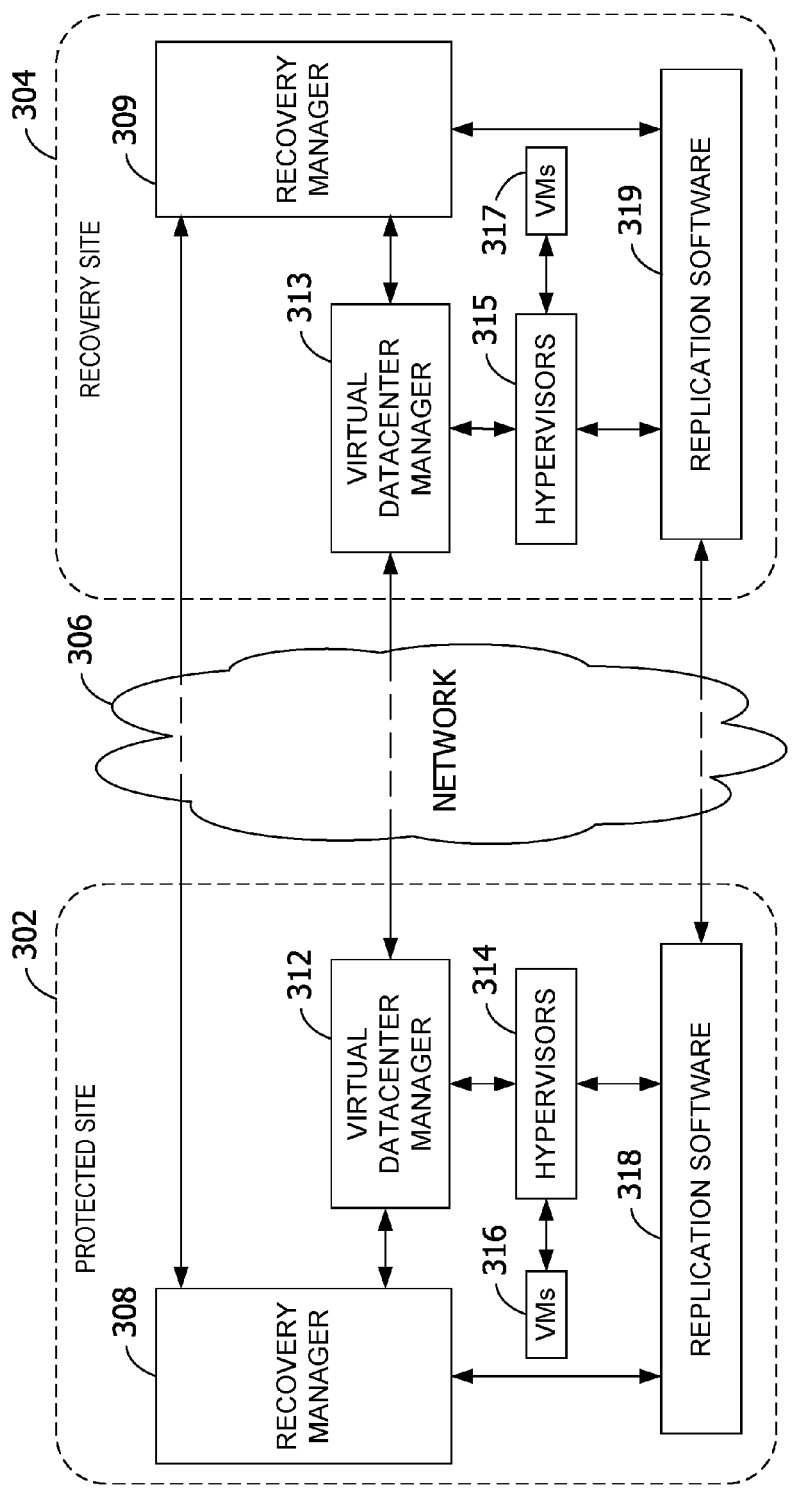
FIG. 3 is a block diagram illustrating a protected site and a recovery site.

Referring next to FIG. 3, a block diagram illustrates a protected site 302 and a recovery site 304. Protected site 302 and recovery site 304 may be referred to as first and second computing devices, primary and secondary computing devices, active and backup computing device, and the like. Further, each of protected site 302 and recovery site 304 may represent a virtual datacenter having any quantity of host computing devices 100, datastores, VMs 235, etc. For example, protected site 302 includes a virtual datacenter manager 312 that manages one or more hypervisors 314, such as hypervisor 210 shown in FIG. 2. Each of hypervisors 314 manages one or more VMs 316. An administrator or other user 108 accesses virtual datacenter manager 312 to perform operations on the components of the virtual datacenter.

Protected site 302 further includes a recovery manager 308. Recovery manager 308 performs failover operations such as recovery, replication, and the like. For example, recovery manager 308 directs replication software 318 to perform replication operations to recovery site 304 via a network 306. Network 306 represents any means for communication between protected site 302 and recovery site 304. Aspects of the disclosure are operable with any network type or configuration.

Recovery site 304 acts as a redundant backup for protected site 302 and thus, in some embodiments, includes components similar to the components in protected site 302. For example, recovery site 304 includes a virtual datacenter manager 313, hypervisors 315, and VMs 317. Recovery site 304 further includes a recovery manager 309 and replication software 319. Recovery manager 308, virtual datacenter manager 312, and replication software 318 in protected site 302 communicate with their counterpart components in recovery site 304 in the example shown in FIG. 3.

In some examples, recovery from detected failure events includes moving one of more VMs 317 and associated datastores from recovery site 304 to protected site 302.

Figure 5:
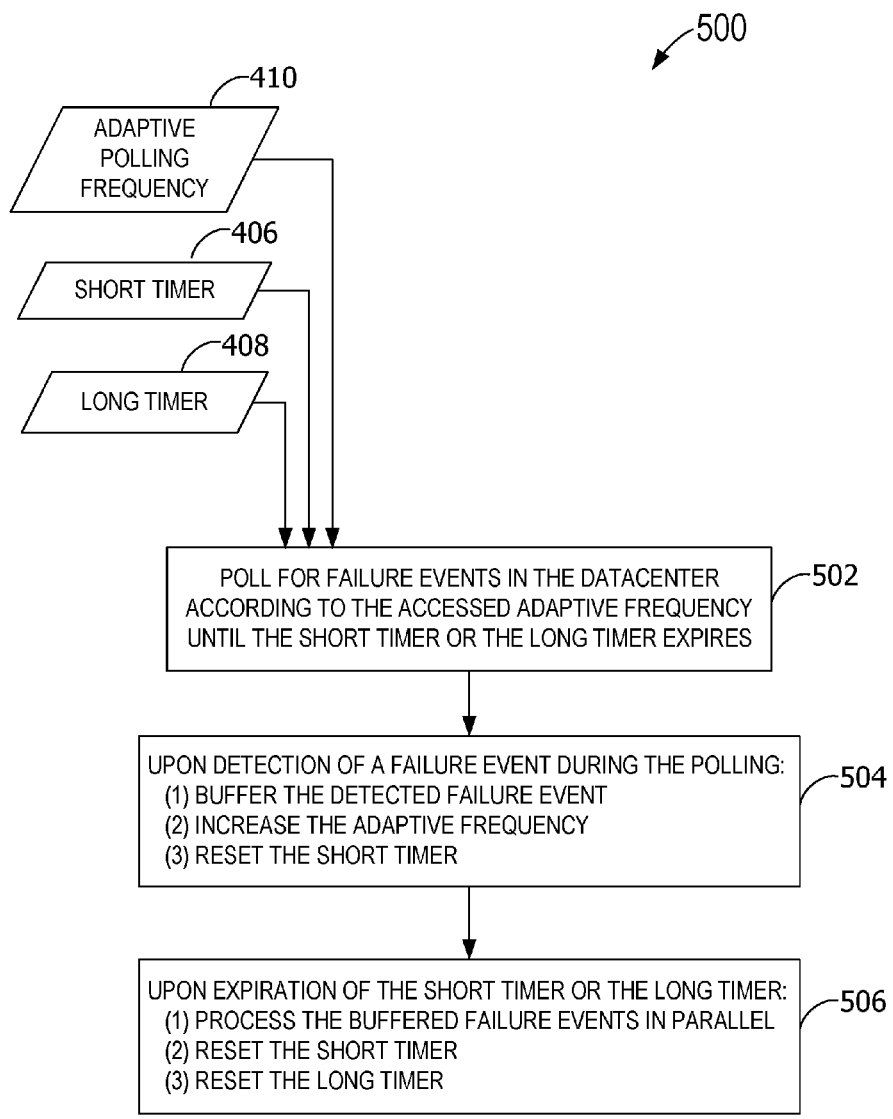
FIG. 5 is a flowchart of an exemplary method performed by a computing device or other entity in a virtual datacenter to detect and group failure events in the datacenter via an adaptive polling frequency.
Figure 6:
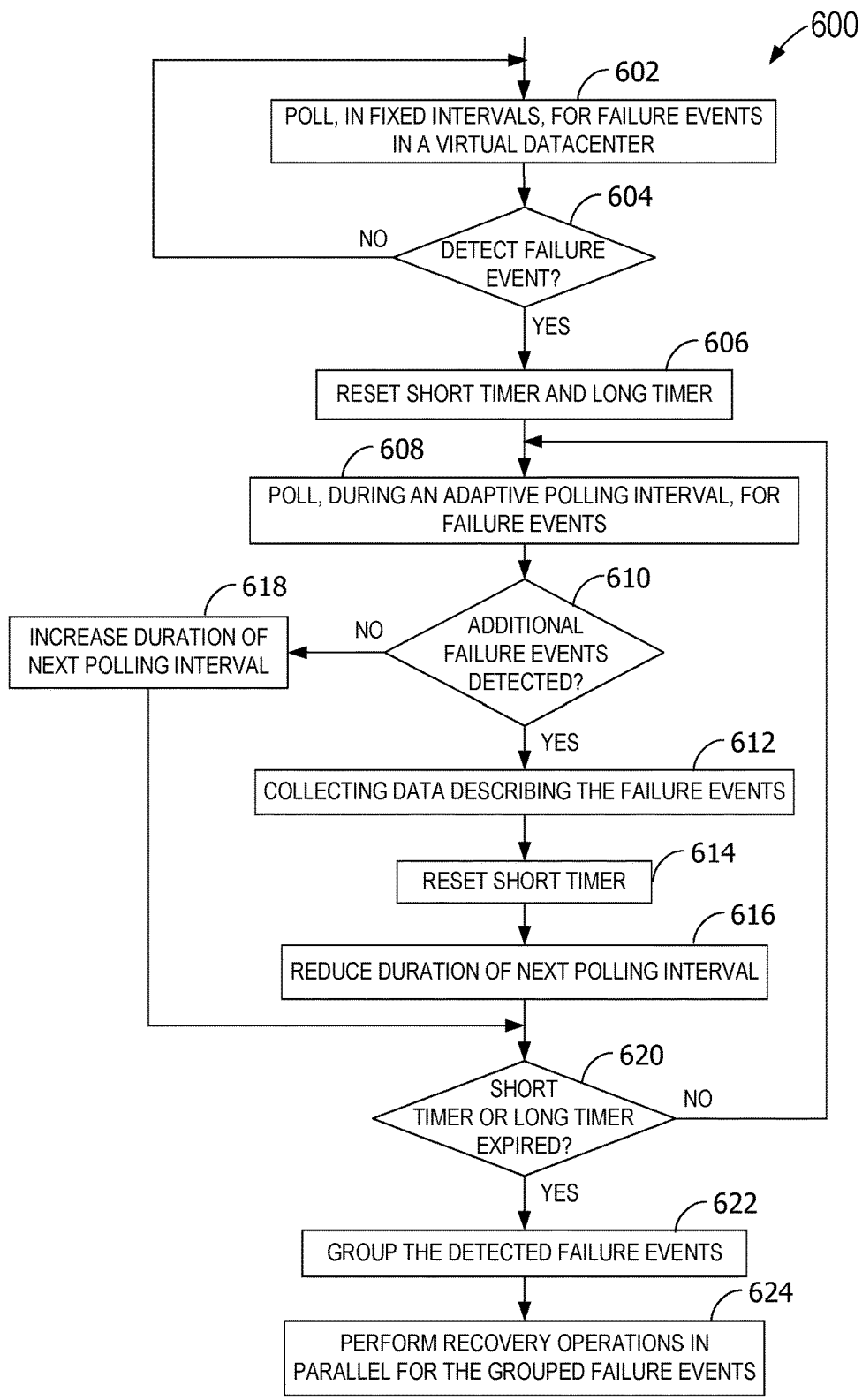
FIG. 6 is a flowchart of an exemplary method performed by a computing device or other entity in a virtual datacenter to detect and group failure events in the datacenter via sliding window buffering.

In some embodiments, recovery manager 308 in protected site 302 performs operations such as those illustrated in FIG. 5 and/or FIG. 6. Alternatively or in addition, the operations illustrated in FIG. 5 and/or FIG. 6 may be performed by a component not shown in FIG. 3.

Figure 4:
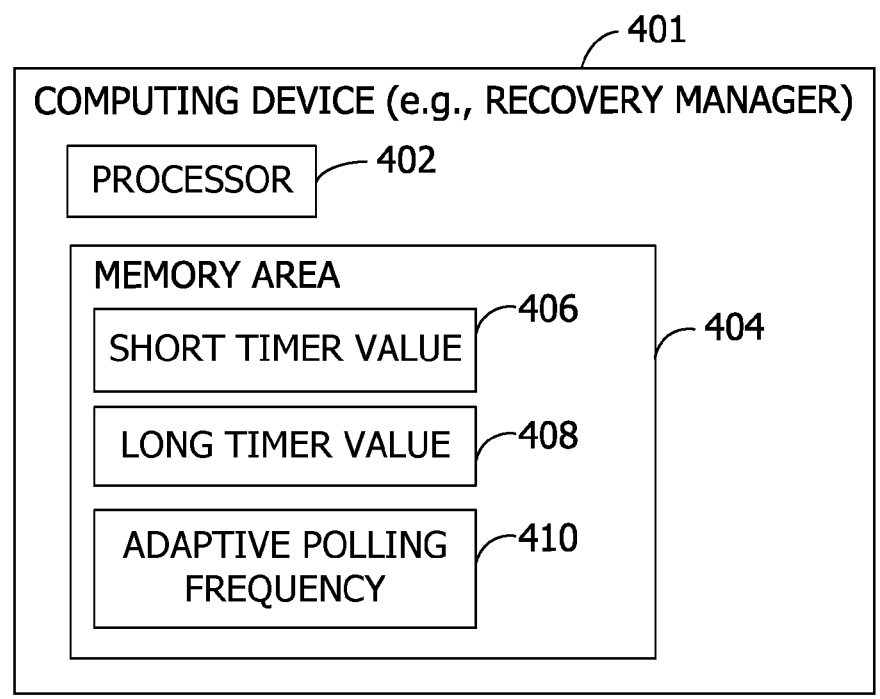
FIG. 4 is a block diagram of an exemplary computing device storing timer values for managing the detection and grouping of failure events.

Referring next to FIG. 4, a block diagram illustrates a computing device 401 storing timer values for managing the detection and grouping of failure events. Computing device 401 represents any device executing instructions (e.g., as application programs, operating system functionality, or both) to implement the operations and functionality described herein. For example, computing device 401 executes instructions such as those illustrated in FIG. 5 and/or FIG. 6, and may be associated with recovery manager 308 in protected site 302. Computing device 401 may include any computing device or processing unit. For example, computing device 401 may represent a group of processing units or other computing devices, such as in a cloud computing configuration.

Computing device 401 has at least one processor 402 and a memory area 404. Processor 402 includes any quantity of processing units, and is programmed to execute computer-executable instructions for implementing aspects of the disclosure. The instructions may be performed by processor 402 or by multiple processors executing within computing device 401, or performed by a processor external to computing device 401. In some embodiments, processor 402 is programmed to execute instructions such as those illustrated in FIG. 5 and/or FIG. 6.

Memory area 404 includes any quantity of computer-readable media associated with or accessible by computing device 401. Memory area 404, or portions thereof, may be internal to computing device 401, external to computing device 401, or both.

In the example of FIG. 4, memory area 404 further stores a short timer value 406, a long timer value 408, and an adaptive polling frequency 410. Each of these values is configurable by administrator or other user 108, in some embodiments. Alternatively or in addition, one or more of short timer value 406, long timer value 408, and adaptive polling frequency 410 may be defined or estimated by other entities in the virtual datacenter such as VMs 235, applications, etc. As an example, the value for the short timer is thirty seconds while the value for the long timer is five minutes. However, other values are contemplated and within the scope of the disclosure.

Short timer value 406 defines a duration for a short timer, and the long timer value 408 defines a duration for a long timer. As described further with reference to FIG. 5 and FIG. 6 below, the short timer acts to logically group together failure events that are likely related. However, in the event of a continuous pour of failure events separated by time intervals less than a window defined by the short timer (e.g., during heavy failure events), the buffering is limited by the long timer to maintain responsiveness and reduce individual disk failure turnaround times. This ensures that disk failures are processed within a pre-defined interval even with continued failure events to reduce latency.

Adaptive polling frequency 410 defines a polling interval, or otherwise specifies how often recovery manager 308 (or other entity) polls for failure events associated with hardware implementing the virtual datacenter. Because polling consumes processing and/or memory resources and thus has a resource cost, the polling is more efficient during intervals having failure events than intervals without any failure events. As such, aspects of the disclosure incrementally increase adaptive polling frequency 410 during the intervals having failure events and incrementally decrease adaptive polling frequency 410 during the intervals without any failure events. The incremental adjustment includes, but is not limited to, exponential adjustment, fixed value (e.g., step-wise) adjustment, and/or combinations thereof. In general, if the failure events occur slowly, embodiments of the disclosure check for additional failure events slowly. If the failure events occur rapidly in succession, embodiments of the disclosure check for additional failure events rapidly in succession. Combining the adaptive polling with sliding window buffering of failure events improves the effective recovery time and is scalable.

Referring next to FIG. 5, a flowchart illustrates an exemplary method 500 performed by computing device 401 or other entity in the virtual datacenter to detect and group failure events in a virtual datacenter via adaptive polling frequency 410. While method 500 is described with reference to execution by computing device 401 executing operations in protected site 302, it is contemplated that method 500 may be performed by any computing device.

Computing device 401 accesses adaptive polling frequency 410, short timer value 406, and long timer value 408 from, for example, memory area 404. Adaptive polling frequency 410 defines a duration for a polling interval. For example, the polling interval is the inverse of adaptive polling frequency 410. That is, if adaptive polling frequency 410 is represented as f, a duration for the polling interval is represented as 1/f. Short timer value 406 defines a value for a short timer, while long timer value 408 defines a value for a long timer. At 502, computing device 401 polls for failure events in the virtual datacenter according to the accessed adaptive polling frequency 410 until the short timer or the long timer expires. For example, computing device 401 repeatedly polls for the failure events during a series of the polling intervals, until the short timer expires and/or the long timer expires.

At 504, upon detection of one or more failure events during one of the polling intervals, computing device 401 buffers each of the detected failure events, increases adaptive polling frequency 410, and resets the short timer. Buffering the detected failure events includes collecting data related to each of the detected failure events, but not yet processing the detected failure events (e.g., recovery operations are not yet performed). For example, computing device 401 collects data relating to a context of the virtual datacenter at the time of each detected failure event. The collected data for each of the detected failure events describes an environment or other context at the approximate time of each failure event. This information is used later by, for example, recovery manager 308 to process the failure events (e.g., perform recovery operations) after the short timer or the long timer expires, as described below.

Computing device 401 increases adaptive polling frequency 410 by, for example, a multiple of adaptive polling frequency 410 (e.g., double). Increasing adaptive polling frequency 410 enables computing device 401 to check for additional failure events more often.

Operations 502 and 504 repeat, as shown, until the short timer or the long timer expires. Upon expiration of the short timer or the long timer, computing device 401 processes the buffered failure events in parallel, resets the short timer, and resets the long timer at 506. Processing the buffered failure events includes, in some embodiments, performing recovery and/or replication operations on the components in the virtual datacenter that are affected by the detected failure events. Recovery is performed in parallel for each of these components. Exemplary recovery operations include replication, migration, and the like.

In some embodiments, upon detection of no failure events during one of the series of polling intervals (e.g., during execution of operation 502), computing device 401 decreases adaptive polling frequency 410. Decreasing adaptive polling frequency 410 enables computing device 401 to check for additional failure events less often.

In this manner, the failure events are detected and grouped in a batch to enable processing (e.g., performing recovery operations related to the failure events) in parallel.

FIG. 6 provides additional description of the operations illustrated in FIG. 5. Referring next to FIG. 6, a flowchart illustrates an exemplary method 600 performed by computing device 401 or other entity in the virtual datacenter to detect and group failure events in the datacenter via sliding window buffering. While method 600 is described with reference to execution by computing device 401 executing operations in protected site 302, it is contemplated that method 600 may be performed by any computing device.

At 602, computing device 401 polls, during a fixed polling interval, for failure events affecting at least one of VMs 235, datastores, or other components in the virtual datacenter. In some embodiments, the failure events include, but are not limited to, a hardware failure. The fixed polling interval may be defined by, for example, administrator or other user 108, or a value in recovery manager 308. Computing device 401 checks at 604 whether a failure event (e.g., an initial failure event) was detected during the fixed polling interval. If no failure event is detected, computing device 401 polls again at 602. The initial failure event represents the first failure event detected after a period of time during which no failure events were detected. For example, the initial failure event represents the first failure event detected after expiration of the short timer or the long timer.

Upon detection of a failure event during the polling interval, computing device 401 resets both the short timer and the long timer at 606 and then starts both the short timer and the long timer. At 608, computing device 401 polls for failure events in the virtual datacenter during an adaptive polling interval. As described with reference to FIG. 5, the adaptive polling interval is defined by adaptive polling frequency 410.

Computing device 401 checks at 610 whether additional failure events were detected during the adaptive polling interval. If no additional failure events are detected, computing device 401 increases a duration of a next adaptive polling interval. In some embodiments, the adaptive polling interval is increased only until a maximum adaptive polling interval (e.g., a threshold) is reached. The threshold may be, for example, a default value, defined by administrator, and/or defined based on the components in virtual datacenter (e.g., quantity of VMs 235, datastores, etc.).

If, however, at least one additional failure event is detected during the adaptive polling interval at 610, computing device 401 collects data describing the detected failure event at 612. Computing device 401 also resets the short timer at 614 and reduces a duration of a next adaptive polling interval at 616.

Unless the short timer or the long timer has expired at 620, computing device 401 polls for the next adaptive polling interval at 608.

At 620, if the short timer has expired or the long timer has expired, computing device 401 groups the detected failure events at 622. For example, computing device 401 groups the failure event detected during the fixed interval with the additional failure events detected during each of the adaptive polling intervals. At 624, computing device 401 processes the grouped failure events in parallel by performing recovery operations associated with the grouped failure events. For example, for failure events that include failure of a disk in an array, performing the recovery operations includes performing a failover of the entire array.

In some embodiments, the polling at 608 may be described as repeating operations 610, 612, 614, 616, 618, and 620 for each of a series of the adaptive polling intervals.

The operations illustrated in FIG. 5 and FIG. 6 may be implemented in computer-executable instructions that, when executed, cause processor 402 to detect and group failure events in the virtual datacenter.

Figure 7:
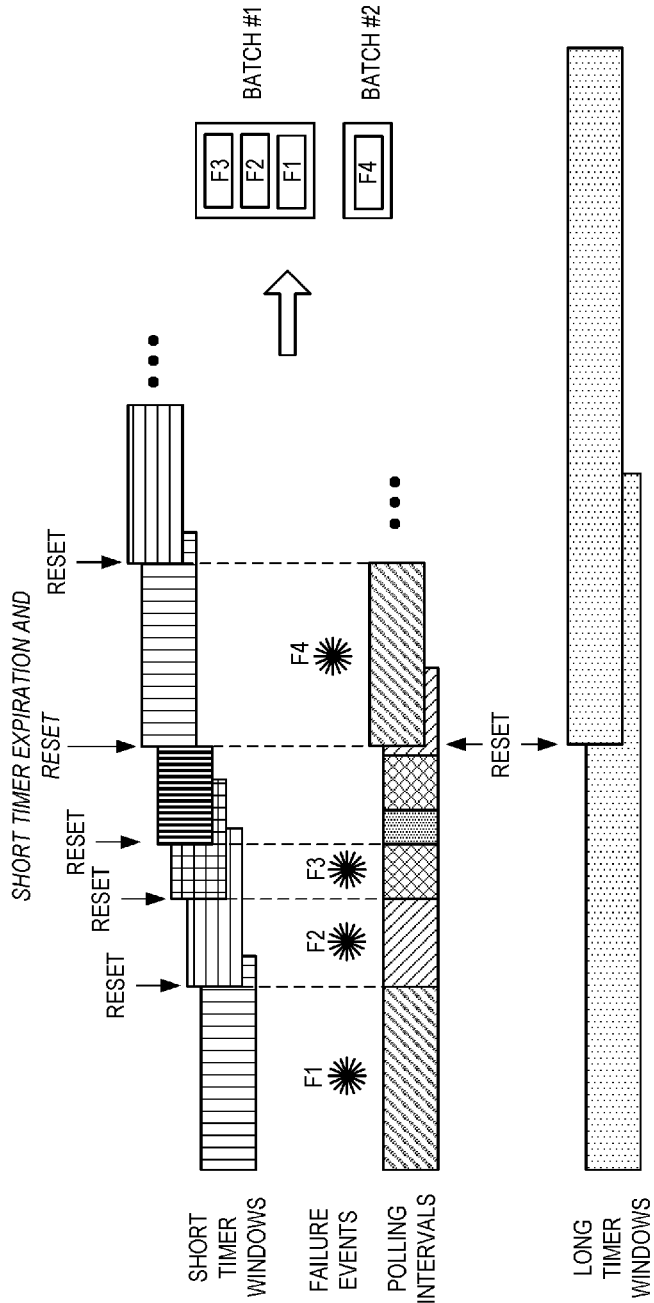
FIG. 7 is a block diagram illustrating interaction among the short timer, long timer, and adaptive polling frequency when the short timer expires.

Referring next to FIG. 7, a block diagram illustrates interaction among the short timer, long timer, and adaptive polling frequency 410 when the short timer expires. The interaction is defined by the exemplary operations described with reference to FIG. 5 and FIG. 6. In the example of FIG. 7, the adaptive polling frequency 410 doubles with each detection of at least one failure event during a polling interval. However, other adjustments to the adaptive polling frequency 410 are contemplated. Further, the illustrated durations of the short timer and the long timer are merely exemplary, and various values may be provided for these timers that are all within the scope of the disclosure.

During the first polling interval illustrated in FIG. 7, failure event F1 is detected. As such, the short timer is reset and adaptive polling frequency 410 is doubled. During the second polling interval, failure event F2 is detected. The short timer is reset again and adaptive polling frequency 410 doubles again. During the third polling interval, failure event F3 is detected. The short timer is reset, and adaptive polling frequency 410 doubles. During the fourth polling interval, no failure event is detected. As such, adaptive polling frequency 410 is reduced by one half (e.g., a duration of the polling interval doubles). During the fifth polling interval, no failure event is detected. As a result, adaptive polling frequency 410 is reduced by one half again. The short timer then expires, either at the end of the fifth or sixth polling interval, or during the sixth polling interval as shown in FIG. 7.

In response to expiration of the short timer, the short timer and the long timer are reset, and the failure events collected so far (e.g., F1, F2, and F3) are grouped together for processing as Batch #1. As shown in FIG. 7, adaptive polling frequency 410 is also reset to a pre-defined value. In other embodiments, however, adaptive polling frequency 410 from the fifth polling interval may be used after the short timer and the long timer are reset.

During the seventh polling interval in this example, failure event F4 is detected. The short timer is reset, and adaptive polling frequency 410 is doubled. The process then continues, as additional failure events may be detected and grouped with failure event F4 into Batch #2.

Figure 8:
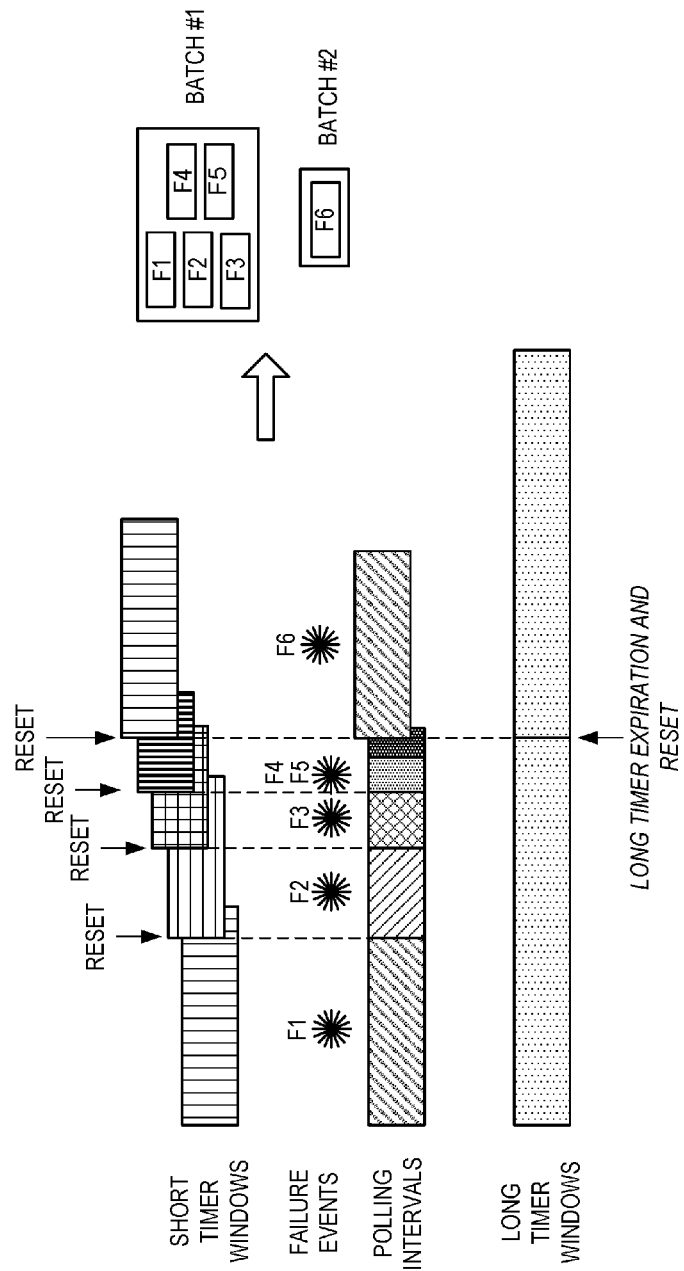
FIG. 8 is a block diagram illustrating interaction among the short timer, long timer, and adaptive polling frequency when the long timer expires.

Referring next to FIG. 8, a block diagram illustrates interaction among the short timer, long timer, and adaptive polling frequency 410 when the long timer expires. The interaction is defined by the exemplary operations described with reference to FIG. 5 and FIG. 6. In the example of FIG. 8, adaptive polling frequency 410 doubles with each detection of at least one failure event during a polling interval. However, other adjustments to adaptive polling frequency 410 are contemplated. Further, the illustrated durations of the short timer and the long timer are merely exemplary, and various values may be provided for these timers that are all within the scope of the disclosure.

During the first polling interval illustrated in FIG. 8, failure event F1 is detected. As such, the short timer is reset and adaptive polling frequency 410 is doubled. During the second polling interval, failure event F2 is detected. The short timer is reset again and adaptive polling frequency 410 doubles again. During the third polling interval, failure event F3 is detected. The short timer is reset, and adaptive polling frequency 410 doubles. During the fourth polling interval, failure events F4 and F5 are detected. As a result, the short timer is reset again and adaptive polling frequency 410 is doubled again. However, the long timer then expires, either at the end of the fourth or fifth polling interval, or during the fifth polling interval as shown in FIG. 8.

In response to expiration of the long timer, the short timer and the long timer are reset, and the failure events collected so far (e.g., F1, F2, F3, F4, and F5) are grouped together for processing into Batch #1. As shown in FIG. 8, adaptive polling frequency 410 is also reset to a pre-defined value. In other embodiments, however, adaptive polling frequency 410 from the fifth polling interval may be used after the short timer and the long timer are reset.

During the sixth polling interval in this example, failure event F6 is detected. The process then continues, as additional failure events may be detected and grouped with failure event F6 into Batch #2.

ADDITIONAL EXAMPLES

The following scenarios are merely exemplary and not intended to be limiting in any way.

In one scenario, the value for the short timer and the duration of the polling interval are the same. That is, the time computing device 401 waits for new failure events is the same duration of the polling interval. Every time another failure event is detected, the polling interval shrinks by one-half until the long timer expires.

Some embodiments contemplate multi-threaded execution such that at least the short timer and the long timer execute in different threads.

As an example, the following pseudocode illustrates an implementation of adaptive polling with sliding window buffering.

Step 1. Poll the virtual datacenter for disk failure events regularly with a poll interval equal to a short timer interval maximum (STMax) until a failure event is detected.

Step 2. If a new failure event is detected, buffer the failure and start a short timer with a value reduced to one-half of the poll interval, and start a long timer with value of LT.

Step 3. Until the long-timer expires:
  A. When the short timer expires, check if there are any new failure events.
    a. If there are no new failure events:
      i. If the long timer expired, process all the buffered event failures and go to Step 1.
      ii. If the value of the short timer is STMax, process all the buffered event failures and go to Step 1.
      iii. Set the value for the short timer to be double the previous value for the short timer.
      iv. Start the short timer and go to Step 3.
    b. If there are new failure events:
      i. Collect (e.g., buffer) the new failure events.
      ii. If the long timer expired, process all the buffered event failures and go to Step 1.
      iii. Set the value for the short timer to be one-half of the previous value for the short timer.
      iv. Start the short timer and go to Step 3.

Step 4. When the long-timer expires, process all the buffered failure events and go to Step 1 above.

In an example applying the pseudocode above in which the short timer expires before the long timer expires, LT is 120 and STMax is 40. Upon detection of a first failure event, data is collected describing the first failure event, the short timer is set to a value of 20 (e.g., one-half of STMax), and both the short timer and the long timer are started. After the short timer expires with no additional failure events detected, the value for the short timer is increased to 40 and the short timer is restarted. After the short timer expires again with no additional failure events detected, the first failure event is processed because the value for the expired short timer is STMax, and the process continues at Step 1 above.

In another example applying the pseudocode above in which the short timer expires before the long timer expires, LT is 120 and STMax is 40. Upon detection of a first failure event, data is collected describing the first failure event, the short timer is set to a value of 20 (e.g., one-half of STMax), and both the short timer and the long timer are started. After the short timer expires, a second failure event is detected and data is collected describing the second failure event. The value for the short timer is reduced to 10 (e.g., one-half of the current value for the short timer) and the short timer is restarted. After the short timer expires with no additional failure events detected, the value for the short timer is increased to 20 (e.g., double the current value for the short timer) and the short timer is restarted. After the short timer expires again with no additional failure events detected, the value for the short timer is increased to 40 (e.g., double the current value for the short timer) and the short timer is restarted. After the short timer expires again with no additional failure events detected, the first and second failure events are processed in parallel because the value for the expired short timer is STMax, and the process continues at Step 1 above.

In an example applying the pseudocode above in which the long timer expires before the short timer expires, LT is 120 and STMax is 40. Upon detection of a first failure event, data is collected describing the first failure event, the short timer is set to a value of 20 (e.g., one-half of STMax), and both the short timer and the long timer are started. After the short timer expires, a second failure event is detected and data is collected describing the second failure event. The value for the short timer is reduced to 10 (e.g., one-half of the current value for the short timer) and the short timer is restarted. After the short timer expires with no additional failure events detected, the value for the short timer is increased to 20 (e.g., double the current value for the short timer) and the short timer is restarted. After the short timer expires again with no additional failure events detected, the value for the short timer is increased to 40 (e.g., double the current value for the short timer) and the short timer is restarted. After the short timer expires with a third failure event detected, data is collected describing the third failure event. The value for the short timer is reduced to 20 (e.g., one-half of the current value for the short timer) and the short timer is restarted. After the short timer expires with no additional failure events detected, the value for the short timer is increased to 40 (e.g., double the current value for the short timer) and the short timer is restarted. Before the short timer is able to expire again, however, the long timer expires. The first, second, and third failure events are then processed in parallel, and the process continues at Step 1 above.

Exemplary Operating Environment

The operations described herein may be performed by a computer or computing device, such as computing device 401. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the invention constitute exemplary means for detecting and grouping the failure events in a datacenter using adaptive polling intervals and sliding window buffering of the failure events.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system for failure event detection and grouping using adaptive polling intervals and sliding window buffering, the system comprising:
   a memory area associated with a computing device, the memory area storing a plurality of virtualization components and datastores accessible thereto, a value for a short timer, and a value for a long timer; and
   a processor programmed to:
      upon detection of a failure event affecting at least one of the plurality of virtualization components and/or datastores, initiate the short timer and the long timer and poll for additional failure events during each of a series of polling intervals, wherein the series of polling intervals continue until either the short timer or the long timer expires, wherein a duration of each subsequent polling interval of the series of polling intervals depends on whether an additional failure was detected during a respective preceding polling interval of the series of polling intervals, the polling during each polling interval of the series of polling intervals comprising:
         upon detection of at least one of the additional failure events during a particular polling interval, collecting data relating to the detected at least one additional failure event, resetting the short timer, and reducing a duration of a next polling interval relative to the particular polling interval;
         group the detected failure event with the detected at least one additional failure event into a group of failure events; and
         perform recovery operations in parallel for each failure event in the grouped failure events.

2. The system of claim 1, wherein the detected at least one additional failure event comprises a hardware failure affecting the at least one of the plurality of VMs or datastores accessible thereto.

3. The system of claim 1, wherein the plurality of VMs and datastores accessible thereto represent a protected site, and wherein performing recovery operations comprises performing replication operations from the protected site to a recovery site.

4. The system of claim 1, wherein the detected at least one additional failure event comprises a disk failure in an array, and wherein performing the recovery operations comprises performing a failover of the array.

5. The system of claim 1, wherein grouping the detected failure event with the detected at least one additional failure event comprises grouping the detected failure event with the detected at least one additional failure event based on a determination that the detected failure event and the detected at least one additional failure event were detected before the long timer expired.

6. The system of claim 1, wherein the processor is programmed to reduce the duration of a next polling interval exponentially upon the detection of at least one of the additional failure events.

7. The system of claim 1, further comprising means for detecting and grouping failure events in a datacenter using adaptive polling intervals and sliding window buffering of the failure events.

8. A method comprising:
   accessing an adaptive polling frequency, a value for a short timer, and a value for a long timer for use in collecting a plurality of failure events in a virtual datacenter having a plurality of virtualization components and a plurality of datastores;
   initiating the short timer and the long timer and polling for failure events in the virtual datacenter according to the accessed adaptive polling frequency, wherein the polling for failure events continues until either the short timer or the long timer expires, wherein the adaptive polling frequency varies depending on detection of failure events; and
   upon detection of one or more of the failure events during the polling, buffering the detected one or more failure events, increasing the adaptive polling frequency, and resetting the short timer, or, upon expiration of the short timer or the long timer, processing the buffered one or more failure events in parallel, resetting the short timer, and resetting the long timer.

9. The method of claim 8, further comprising, upon no detection of a failure event during the polling, decreasing the adaptive polling frequency.

10. The method of claim 8, wherein polling for the failure events comprises polling for the failure events during a series of polling intervals defined by the adaptive polling frequency.

11. The method of claim 8, wherein buffering the one or more detected failure events comprises collecting data describing the one or more detected failure events.

12. The method of claim 8, wherein processing the buffered one or more failure events in parallel comprises performing recovery operations in parallel for each of the buffered one or more failure events.

13. The method of claim 8, wherein processing the buffered one or more failure events in parallel comprises performing replication operations in parallel for each of the buffered one or more failure events.

14. The method of claim 8, wherein the value for the short timer and the adaptive polling frequency are the same.

15. The method of claim 8, wherein the short timer and the long timer are implemented as different threads in an application.

16. One or more non-transitory computer storage media including computer-executable instructions that, when executed, cause at least one processor to detect and group a plurality of failure events in a virtual datacenter having a plurality of virtualization components and datastores by:

upon detection of a failure event affecting at least one of the plurality of virtualization components or associated datastores, initiating the short timer and the long timer and polling for additional failure events in the virtual datacenter during each of a series of polling intervals, wherein the series of polling intervals continue until either an expiration of a short timer having a first value or a long timer having a second value, wherein a duration of each subsequent polling interval of the series depends on whether an additional failure was detected during a respective preceding polling interval of the series, the polling during each polling interval of the series of polling intervals comprising:

upon detection of at least one additional failure event during a particular polling interval, receiving data relating to the detected additional failure event, resetting the short timer, and reducing a duration of a next polling interval relative to the particular polling interval;

grouping two or more failure events detected during the polling into a group of failure events; and processing each of the two or more failure events in the group of failure events in parallel.

17. The non-transitory computer storage media of claim 16, wherein the computer-executable instructions cause the processor to poll for the failure events after detection of an initial failure event in the virtual datacenter.

18. The non-transitory computer storage media of claim 16, wherein the computer-executable instructions cause the processor to process the group of failure events by performing recovery operations for each of the two or more failure events in the group of failure events in parallel.

19. The non-transitory computer storage media of claim 16, wherein the computer-executable instructions cause the processor to process the group of failure events by performing replication operations for each of the two or more failure events in the group of failure events in parallel.

20. The non-transitory computer storage media of claim 16, wherein the computer-executable instructions cause the processor to: upon no detection of at least one additional failure event during the particular polling interval, increasing a duration of a next polling interval relative to the particular polling interval.

* * * * *